US012502350B2

(12) United States Patent
Richter et al.

(10) Patent No.: US 12,502,350 B2
(45) Date of Patent: Dec. 23, 2025

(54) COSMETIC PREPARATION AGAINST ACNE

(71) Applicants: BEIERSDORF AG, Hamburg (DE); S-BIOMEDIC, Beerse (BE)

(72) Inventors: Daniel Richter, Norderstedt (DE); Jennifer Huepeden, Hamburg (DE); Joern Hendrik Reuter, Henstedt Ulzburg (DE); Heike Foelster, Hamburg (DE); Bernhard Felten, Pinneberg (DE); Jane Djamil, Hamburg (DE)

(73) Assignees: BEIERSDORF AG, Hamburg (DE); S-BIOMEDIC, Beerse (BE)

( * ) Notice: Subject to any disclaimer, the term of this patent is extended or adjusted under 35 U.S.C. 154(b) by 744 days.

(21) Appl. No.: 17/251,301

(22) PCT Filed: Jun. 14, 2019

(86) PCT No.: PCT/EP2019/065783
§ 371 (c)(1),
(2) Date: Dec. 11, 2020

(87) PCT Pub. No.: WO2019/238968
PCT Pub. Date: Dec. 19, 2019

(65) Prior Publication Data
US 2021/0251885 A1 Aug. 19, 2021

(30) Foreign Application Priority Data

Jun. 14, 2018 (DE) .......................... 102018209519.1

(51) Int. Cl.
| | | |
|---|---|---|
| A61K 8/99 | (2017.01) |
| A61K 8/06 | (2006.01) |
| A61K 8/34 | (2006.01) |
| A61K 8/362 | (2006.01) |
| A61K 8/365 | (2006.01) |
| A61K 8/368 | (2006.01) |
| A61K 8/73 | (2006.01) |
| A61K 8/81 | (2006.01) |
| A61Q 19/00 | (2006.01) |

(52) U.S. Cl.
CPC ............... *A61K 8/99* (2013.01); *A61K 8/062* (2013.01); *A61K 8/345* (2013.01); *A61K 8/362* (2013.01); *A61K 8/365* (2013.01); *A61K 8/368* (2013.01); *A61K 8/732* (2013.01); *A61K 8/735* (2013.01); *A61K 8/8147* (2013.01); *A61Q 19/00* (2013.01); *A61K 2800/34* (2013.01); *A61K 2800/882* (2013.01)

(58) Field of Classification Search
CPC .......... A61K 8/99; A61K 8/345; A61K 8/362; A61K 8/365; A61K 8/368; A61K 8/732; A61K 8/735; A61K 8/8147; A61K 31/55; A61K 31/404; A61K 31/405; A61K 31/4523; A61K 31/454; A61K 31/496; A61K 47/10; A61K 9/0014; A61K 2800/10; A61K 31/137; A61K 31/4174; A61K 47/06; A61K 47/14; A61K 47/32; A61K 8/14; A61K 8/8182; A61K 9/06; A61K 9/1271; A61K 2800/78; A61K 31/498; A61K 31/502; A61K 31/506; A61K 47/12; A61K 47/18; A61K 47/183; A61K 47/24; A61K 47/26; A61K 47/38; A61K 8/19; A61K 8/31; A61K 8/35; A61K 8/37; A61K 8/466; A61K 8/494; A61K 8/4946; A61K 8/8152; A61K 8/87; A61K 9/0019; A61K 9/1075; A61K 9/12; A61K 9/7023

See application file for complete search history.

(56) References Cited

U.S. PATENT DOCUMENTS

| | | | |
|---|---|---|---|
| 5,490,736 A * | 2/1996 | Haber ................. | A61M 35/006 604/3 |
| 2005/0238679 A1 * | 10/2005 | Biergiesser ........... | A61Q 17/00 514/553 |
| 2012/0101104 A1 * | 4/2012 | Buge .................. | A61K 31/4174 514/249 |
| 2017/0065647 A1 | 3/2017 | Kim et al. | |
| 2017/0189454 A1 | 7/2017 | Heywood et al. | |
| 2018/0142202 A1 | 5/2018 | Paetzold et al. | |
| 2019/0030090 A1 | 1/2019 | Li et al. | |
| 2019/0314428 A1 | 10/2019 | Paetzold et al. | |

FOREIGN PATENT DOCUMENTS

| | | | | |
|---|---|---|---|---|
| WO | 2016172196 A1 | 10/2016 | | |
| WO | 2017136738 A2 | 8/2017 | | |
| WO | WO-2018073651 A1 * | 4/2018 | ........... | A61K 35/741 |
| WO | 2018077598 A1 | 5/2018 | | |

OTHER PUBLICATIONS

Hercules Incorporated, "NATROSOL® Hydroxyethylcellulose, A Nonionic Water-Soluble Polymer: Physical and Chemical Properties", 1999, p. 1-24. (Year: 1999).*

Kulthanan et al. "The pH of water from various sources: an overview for recommendation for patients with atopic dermatitis", 2013, Asia Pacific Allergy, vol. 3, p. 155-160.. (Year: 2013).*

Vetter Pharma International GmbH, "Vetter dual-chamber delivery systems", Dec. 16, 2014, Pharmaceutical Networking, Website accessed Nov. 1, 2023, p. 1-4. (Year: 2014).*

(Continued)

*Primary Examiner* — Audrea B Coniglio
(74) *Attorney, Agent, or Firm* — Abel Schillinger, LLP

(57) ABSTRACT

Cosmetic product of a packaging means having two spatially separated chambers, wherein the first chamber contains a lyophilisate of bacteria of the strains *C. acnes* 6609 (H1), C1, C3, D1, A5, H1, H2, H3, K1, K2, K4, K6, K8, K9, L1 and/or F4, and the second chamber contains a cosmetic preparation containing water and a method for treating acne with this preparation.

20 Claims, No Drawings

(56) References Cited

OTHER PUBLICATIONS

Scholz et al., "A Novel High-Resolution Single Locus Sequence Typing Scheme for Mixed Populations of Propionibacterium acnes In Vivo", PLOS ONE, vol. 9, No. 8, Aug. 11, 2014 (Aug. 11, 2014), p. e104199.

* cited by examiner

COSMETIC PREPARATION AGAINST ACNE

BACKGROUND OF THE INVENTION

1. Field of the Invention

The present invention relates to a cosmetic product of a packaging means having two spatially separated chambers, wherein the first chamber contains a lyophilisate of bacteria of the strains C. acnes 6609 (H1), C1, C3, D1, A5, H1, H2, H3, K1, K2, K4, K6, K8, K9, L1 and/or F4, and the second chamber contains a cosmetic preparation containing water, and to a method for treating acne with this preparation.

2. Discussion of Background Information

The desire to look beautiful and attractive is rooted in human nature. Even though the ideal of beauty has undergone changes over time, the pursuit of a flawless appearance has always been the goal of people, since a sympathetic appearance increases their self-esteem and attractiveness to their fellow men. A significant part of a beautiful and attractive appearance is the condition and appearance of the skin.

In oily and impure skin, which is the transitional state between a healthy, normal skin and a pathologically changed acne skin, the skin produces increased amounts of sebum (seborrhea). Seborrhea serves as an ideal breeding ground for numerous microorganisms, especially for *Propionibacterium acnes* (now known as *Cutibacterium acnes, C. acnes*, which is why the new abbreviation C. acnes is used instead of *P. acnes* herein) and Pityrosporum species. The microorganisms decompose the sebum to glycerin and fatty acids, which stimulates the sebaceous glands to increase their production and attacks and destroys the follicular walls in the skin. This causes inflammations in the skin (pimples, pustules, nodules, cysts), which often heal only by scarring, causing permanent damage to the visual appearance of people suffering from impure skin (W. Umbach [Hrsg.], Kosmetik, Entwicklung, Herstellung und Anwendung kosmetischer Mittel, 2nd ed. Thieme publishing house, Stuttgart, 1995).

Acne (*Acne vulgaris* in the narrower sense) comprises a variety of diseases of the sebaceous gland follicles, which are characterized by secretion and cornification disorders, subsequent inflammation and possible scarring. *Acne vulgaris* mainly occurs during puberty and is usually concentrated in areas of the skin which are rich in sebaceous glands (face, neck, chest, back). Hyperplasia of the sebaceous glands and a cornification disorder of the follicles lead to their blockage with formation of comedones and the efflorescences which are typical for *Acne vulgaris* (Pschyrembel, Klinisches Wörterbuch, 258th edition, Walter de Gruyter-Verlag, Berlin, 1998).

Conventional products for treating oily and/or impure skin as well as acne skin usually have the disadvantage of straining the skin, drying it out and providing little care.

In the treatment of acne, strongly acidic (pH values below pH 4.0) as well as strongly oxidizing agents (e.g. benzoyl peroxide) are also used, which stress the acid mantle of the skin and attack or corrode the skin.

It was therefore the objective of the present invention to develop a caring cosmetic and/or dermatological preparation for the treatment of oily and impure skin as well as for the treatment of acne (and in particular *Acne vulgaris*) which is significantly milder and better than those known from the prior art. Furthermore, it was the objective of the present invention to develop a cosmetic and/or dermatological preparation for the treatment of acne (and in particular *Acne vulgaris*) which is effective at a skin-friendly pH value (pH greater than pH 4.0), does not corrode the skin and at best only slightly strains the acid mantle of the skin. In addition, preparations should be developed which, at a skin-friendly pH value (pH greater than pH 4.0), suppress the growth and spread of acne-causing bacteria on the skin. Furthermore, the concentration of acne-causing bacteria on the skin and in the sebaceous glands should be significantly reduced by these preparations.

SUMMARY OF THE INVENTION

The objects are surprisingly achieved by a cosmetic product of a packaging means with two spatially separated chambers, the first chamber containing a lyophilisate of bacteria of the strains C. acnes 6609 (H1), C1, C3, D1, A5, H1, H2, H3, K1, K2, K4, K6, K8, K9, L1 and/or F4 and the second chamber containing a cosmetic preparation containing water.

The lyophilisate can be prepared of bacteria of the strains C. acnes 6609 (H1), C1, C3, D1, A5, H1, H2, H3, K1, K2, K4, K6, K8, K9, L1 and/or F4 by one of the conventional prior art methods for the lyophilisation of bacteria (for example with addition of dextran and/or glycerol), which can be taken from the standard textbooks of pharmaceutical technology.

Although the state of the art comprises WO 2016/172196 and WO 2018/073651, which also disclose the C. acnes strains according to the invention, these disclosures could not point into the direction of the present invention, because it is among others not disclosed with which medium the C. acnes bacteria can be activated in sufficient quantity. Although WO 2016/172196 refers to the basic possibility of using freeze-dried bacteria, it was very difficult for the skilled person to reactivate these in medically harmless but effective amounts on the skin in a short time. It has also not been disclosed by which means the bacteria can be applied in a targeted manner and in a uniform (homogeneous) concentration to the affected skin areas in a way that is easy to handle even for laymen, as not every cosmetic product is a suitable carrier for this purpose. Phase separations, agglomeration, depositions from the preparation, viscosity changes are typical problems which occur during the incorporation of lyophilisates. Last but not least, practically all cosmetics contain ingredients which are supposed to protect them against microbial decomposition, so that in case of a simple combination of a cosmetic preparation and bacteria it could be assumed that the latter are more or less completely killed by the preservative components of the cosmetic preparation.

In addition to the lyophilisate of bacteria, the first chamber may contain cosmetic ingredients such as oils and/or thickeners. According to the invention it may also be advantageous to add peptone and/or hydroxyethyl cellulose as suggested in WO 2018/073651.

According to the invention, it is preferred to use the C. acnes strains C3 and/or K8. The combination of both strains in equal proportions is preferred according to the invention.

According to the invention, it is particularly preferred to combine these strains (i.e. C3 and/or K8) with C. acnes strains A5 and/or F4.

According to the invention, it is advantageous if the cosmetic preparation has a pH value of 4 to 8 in the second chamber.

In order to impart the correct consistency for the application to the product according to the invention, it is advantageous according to the invention if the cosmetic preparation contains one or more thickening agents in the second chamber.

In particular, it is advantageous for the purposes of the present invention if the cosmetic preparation in the second chamber has a viscosity of at least 500 mPas. According to the invention, the viscosities are measured with the Rheomat R 123 device with the spindle measuring body 1 and a constant speed of 62.5 per minute at a temperature of 25° C.

According to the invention, it is preferred if the cosmetic preparation in the second chamber contains carageenan and/or polyacrylic acid. According to the invention, the term polyacrylic acid also includes the salts (especially the sodium salt) of this compound.

If the preparation contains carageenan, a concentration of 0.01 to 1% by weight, based on the total weight of the cosmetic preparation in the second chamber is preferred according to the invention.

If the preparation contains polyacrylic acid (carbomer), a concentration of 0.01 to 1% by weight based on the total weight of the cosmetic preparation in the second chamber is preferred according to the invention.

On the other hand, it is a disadvantage according to the invention to thicken the preparation in the second chamber with xanthan gum, because in this case agglomeration and clumping can occur in the preparation.

Therefore, advantageous embodiments of the present invention are characterized in that the cosmetic preparation in the second chamber is free of xanthan gum.

According to the invention, it is advantageous if the cosmetic preparation in the second chamber is free of parabens, methylisothiazolinone, chloromethylisothiazolinone, 3-iodo-2-propynyl butylcarbamate, DMDM hydantoin, 2-hydroxy-4-methoxybenzophenone, 2-ethylhexyl 4-methoxycinnamate, isoamyl 4-methoxcinnamate, 3-(4-methylbenzylidene)camphor.

According to the invention, it is generally preferred that the cosmetic preparation in the second chamber is free of antimicrobially active substances. Therefore, the second chamber of the product according to the invention is advantageously designed in such a way that the filling is carried out under sterile conditions, the chamber is then airtightly sealed and its contents are removed from the storage container by means of a withdrawal device by a single withdrawal (single use) and, after mixing with the lyophilisate of the first chamber, is immediately applied.

Advantageous embodiments of the present invention are also characterized in that the cosmetic preparation in the second chamber contains glycerol, panthenol, ubiquinone Q10 and/or hyaluronic acid.

If the preparation contains glycerol, a concentration of 1 to 10% by weight based on the total weight of the cosmetic preparation in the second chamber is preferred according to the invention.

If the preparation contains panthenol, a concentration of 0.01 to 5% by weight based on the total weight of the cosmetic preparation in the second chamber is preferred according to the invention.

If the preparation contains hyaluronic acid, a concentration of 0.01 to 2% by weight based on the total weight of the cosmetic preparation in the second chamber is preferred according to the invention.

If the preparation contains ubiquinone Q10, a concentration of 0.01 to 0.05% by weight based on the total weight of the cosmetic preparation in the second chamber is preferred according to the invention.

According to the invention, the cosmetic preparation in the second chamber may further preferably contain anti-inflammatory substances, e.g. polidocanol, bisabolol, aloe vera extract, chamomile flower extract, *Glycyrrhiza inflata* root extract.

According to the invention, a water content of up to 100% by weight based on the total weight of the cosmetic preparation in the second chamber is advantageous for the cosmetic preparation in the second chamber.

According to the invention, it is advantageous if the cosmetic preparation in the second chamber contains salicylic acid, lactic acid and/or citric acid.

If the preparation contains salicylic acid, a concentration of 0.01 to 2% by weight based on the total weight of the cosmetic preparation in the second chamber is preferred according to the invention.

If the preparation contains lactic acid, a concentration of 0.01 to 3% by weight based on the total weight of the cosmetic preparation in the second chamber is preferred according to the invention.

If the preparation contains citric acid, a concentration of 0.01 to 2% by weight based on the total weight of the cosmetic preparation in the second chamber is preferred according to the invention.

According to the invention, the cosmetic preparation in the second chamber may advantageously contain one or more fragrance compounds. These fragrance compounds can be selected, for example, from the group of compounds consisting of limonene, citral, linalool, alpha-isomethylionone, geraniol, citronellol, 2-isobutyl-4-hydroxy-4-methyltetrahydropyran, 2-tert-pentylcyclohexyl acetate, 3-methyl-5-phenyl-1-pentanol, 7-acetyl-1,1,3,4,4,6-hexamethyltetralin, adipic diester, alpha-amylcinnamaldehyde, alpha-methylionone, amyl C, butylphenylmethyl propionalcinnamal, amylsalicylate, amylcinnamyl alcohol, anisyl alcohol, benzoin, benzyl alcohol, benzyl benzoate, benzyl cinnamate, benzyl salicylate, bergamot oil, bitter orange oil, butylphenyl methyl propioal, cardamom oil, cedrol, cinnamal, cinnamyl alcohol, citronellyl methyl crotonate, lemon oil, coumarin, diethyl succinate, ethyllinalool, eugenol, ethylene brassylate, *Evernia furfuracea* extract, *Evernia prunastri* extract, farnesol, Guaiac wood oil, geraniol, hexyl cinnamal, hexyl salicylate, hydroxycitronellal, lavender oil, lemon oil, linayl acetate, mandarin oil, menthyl PCA, methyl heptenone, nutmeg oil, rosemary oil, sweet orange oil, terpineol, thymol, tonka bean oil, triethyl citrate and/or vanillin.

According to the invention, the cosmetic preparation in the second chamber can preferably be present in two forms:

The first form is characterized in that the cosmetic preparation in the second chamber is in the form of an aqueous preparation. In this embodiment, it is preferred according to the invention if the preparation is present as a gel.

The second form is characterized in that the cosmetic preparation in the second chamber is in the form of an oil-in-water emulsion.

In this case, it is advantageous according to the invention if the cosmetic preparation in the second chamber contains glyceryl stearate citrate, cetearyl alcohol, sodium cetearyl sulfate, glyceryl stearate, cetearyl sulfosuccinate, sodium stearoyl glutamate, polyglyceryl-3-methylglucose distearate, stearic acid, potassium cetyl phosphate, polyglyceryl-10 stearate (INCI Polyglyceryl-10 Stearate) and/or polyglyceryl-2 caprate.

According to the invention, preparation forms based on W/O emulsions are however disadvantageous.

Advantageous embodiments of the present invention are also characterized in that the cosmetic preparation contains starch in the second chamber.

If the cosmetic preparation according to the invention contains an oil phase (for example, if an O/W emulsion is used in the second chamber), it is advantageous according to the invention if the cosmetic preparation in the second chamber contains triglycerides and/or octyldodecanol.

In addition, the oil phase can contain oils from the group of lecithins, cocoglyceride, olive oil, sunflower oil, jojoba oil, soybean oil, peanut oil, rapeseed oil, almond oil, palm oil, coconut oil, castor oil, wheat germ oil, grape seed oil, safflower oil, evening primrose oil, macadamia nut oil and the like.

On the other hand, it is disadvantageous if the cosmetic preparation in the second chamber contains silicone oils, mineral oil and polyethylene glycols.

According to the invention, advantageous embodiments of the present invention are thus characterized in that the cosmetic preparation in the second chamber is free of silicone oils, mineral oil and polyethylene glycols.

In order to ensure a medically safe and cosmetically effective application, a balanced ratio of lyophilisate to the water-containing cosmetic preparation is of relevance.

According to the invention, it is therefore advantageous if the weight ratio of lyophilisate to the water-containing cosmetic preparation is 1:10 to 1:100.

According to the invention, the cosmetic product preferably contains 1-10% by weight of lyophilisate and 99-90% by weight of the water-containing cosmetic preparation after mixing the contents of the two chambers.

Furthermore, it is advantageous according to the present invention if the ratio of lyophilisate to the water-containing cosmetic preparation is such that $10^4$ to $10^7$ bacteria are present per 2 g water-containing cosmetic preparation.

Advantageous embodiments of the present invention are characterized in that the packaging means contains a withdrawal device and a mixing device with which the contents of both chambers can be mixed in a closed system and the mixture can be withdrawn from an opening.

According to the invention, it is also an advantage if the volume of the second chamber is 1.5 to 2.5 $cm^3$.

Packaging means can include, for example, Lyo-Ject® double-chamber syringes, V-LK® double-chamber cartridges or double-chamber systems as those disclosed in WO 2018/077598 A1.

A method for the cosmetic treatment of acne is also disclosed according to the invention, wherein the contents of the first and second chamber of a above-described cosmetic product according to the invention are mixed, removed and applied to the skin affected by acne in an amount of 0.003 to 0.005 $g/cm^2$.

It is usually applied to the skin 0-12 seconds after the contents of both chambers have been mixed together.

It is advantageous for the method according to the invention if the skin affected by acne is cleaned with a surfactant-containing cleansing preparation before applying the cosmetic product.

According to the invention, it is also advantageous if the skin affected by acne is disinfected with a preparation containing benzoyl peroxide before applying the cosmetic product.

DETAILED DESCRIPTION OF EXEMPLARY EMBODIMENTS OF THE INVENTION

EXAMPLE

The following example is intended to illustrate the invention without limiting it. All quantities, proportions and percentages are, unless stated otherwise, related to the weight and the total quantity or to the total weight of the additions.

The following exemplary formulations can be present in packaging means such as Lyo-Ject® double-chamber syringes or multi-chamber blister (Rohrer AG). In the following, the examples from the first and second chamber are combined.

| Ingredient | Example 1 | Example 2 | Example 3 | Example 4 | Example 5 |
|---|---|---|---|---|---|
| first chamber [% by weight] | | | | | |
| Carageenan | 0.50 | | | | |
| Citrate | | 0.17 | | | |
| C. acnes* | 5.00 | 1.00 | 10.00 | 8.00 | 2.00 |
| Glycerol | | | | | 10.00 |
| Sodium chloride | | 0.90 | 0.90 | | |
| Neutral oil | | | 20.00 | | |
| Octyldodecanol | | | 10.00 | | |
| Polyacrylic acid | | 0.50 | | | |
| Starch | | | | | 2.00 |
| Citric acid | | 0.09 | | | |
| second chamber [% by weight] without preservation | | | | | |
| Carageenan | | | | 0.20 | |
| Citrate | 0.17 | | | | |
| Glycerol | | 5.00 | | | |
| Hyaluronic acid | | | 1.00 | | |
| Polyacrylic acid | | | | | 0.20 |
| Water | 94.24 | 92.34 | 58.10 | 91.80 | 85.80 |
| Citric acid | 0.09 | | | | |

*The C. acnes strains mentioned in claim 1 are used individually or in combination in the indicated amount.

What is claimed is:

1. A cosmetic product, wherein the product comprises a single container having two spatially separated chambers, the first chamber comprising a lyophilisate of bacteria of *Cutibacterium acnes* (*C. acnes*) strains 6609 (H1), C1, C3, D1, A5, H1, H2, H3, K1, K2, K4, K6, K8, K9, L1 and/or F4 and the second chamber comprising a water-containing cosmetic preparation which comprises one or more of glycerol, panthenol, ubiquinone Q10, and/or hyaluronic acid.

2. The cosmetic product of claim 1, wherein the cosmetic preparation in the second chamber has a pH of from 4 to 8.

3. The cosmetic product of claim 1, wherein the cosmetic preparation in the second chamber comprises carrageenan and/or polyacrylic acid.

4. The cosmetic product of claim 1, wherein the cosmetic preparation in the second chamber is free of xanthan gum.

5. The cosmetic product of claim 1, wherein the cosmetic preparation in the second chamber is free of parabens, methylisothiazolinone, chloromethylisothiazolinone, 3-iodo-2-propynyl butylcarbamate, DMDM-hydantoin, 2-hydroxy-4-methoxybenzophenone, 2-ethylhexyl 4-methoxycinnamate, isoamyl 4-methoxycinnamate, and 3-(4-methylbenzylidene)camphor.

6. The cosmetic product of claim 1, wherein the cosmetic preparation in the second chamber contains one or more of salicylic acid, lactic acid, and/or citric acid.

7. The cosmetic product of claim 1, wherein the cosmetic preparation in the second chamber is an aqueous preparation.

8. The cosmetic product of claim 1, wherein the cosmetic preparation in the second chamber comprises starch.

9. The cosmetic product of claim 1, wherein the cosmetic preparation in the second chamber comprises triglycerides and/or octyldodecanol.

10. The cosmetic product of claim 1, wherein the cosmetic preparation in the second chamber is free of silicone oils, mineral oil and polyethylene glycols.

11. The cosmetic product of claim 1, wherein the cosmetic preparation in the second chamber has a viscosity of at least 500 mPa·s.

12. The cosmetic product of claim 1, wherein a weight ratio of lyophilisate to water-containing cosmetic preparation is 1:10 to 1:100.

13. The cosmetic product of claim 1, wherein a ratio of lyophilisate to water-containing cosmetic preparation is selected such that $10^4$ to $10^7$ bacteria are present per 2 g of water-containing cosmetic preparation.

14. The cosmetic product of claim 1, wherein the first chamber comprises a lyophilisate of bacteria of *C. acnes* strains C3 and/or K8.

15. The cosmetic product of claim 14, wherein the *C. acnes* strains C3 and K8 are used in equal proportions.

16. The cosmetic product of claim 14, wherein the first chamber further comprises *C. acnes* strains A5 and/or F4.

17. The cosmetic product of claim 1, wherein the container further comprises a withdrawal device and a mixing device with which the contents of both chambers can be mixed in a closed system and a resultant mixture can be withdrawn from an opening.

18. The cosmetic product of claim 1, wherein the contents of the first and second chambers of the container in mixed form are capable of treating acne when applied to skin affected by acne in an amount of from 0.003 $g/cm^2$ to 0.005 $g/cm^2$.

19. The cosmetic product of claim 1, wherein the single container is a double-chamber syringe or a multi-chamber blister.

20. The cosmetic product of claim 1, wherein the first chamber further contains one or more of sodium chloride, octyldodecanol, neutral oil, and glycerol.

* * * * *